United States Patent [19]
Mogck

[11] Patent Number: 5,634,440
[45] Date of Patent: Jun. 3, 1997

[54] CONVERTIBLE STEP AND RAMP COMBINATION

[75] Inventor: Leonard F. Mogck, Colorado Springs, Colo.

[73] Assignee: Cindy L. Mayes, Colorado Springs, Colo.

[21] Appl. No.: 517,253

[22] Filed: Aug. 21, 1995

[51] Int. Cl.[6] ............................. A01K 29/00; A01K 1/035
[52] U.S. Cl. ............................................. 119/847; 119/706
[58] Field of Search ................................. 119/174, 485, 119/706, 847, 848, 849; 52/182, 183

[56] References Cited

U.S. PATENT DOCUMENTS

| D. 322,872 | 12/1991 | Holbrook | D30/160 |
|---|---|---|---|
| 914,805 | 3/1909 | Cross | 472/48 |
| 3,618,568 | 11/1971 | Breeden | 119/482 |
| 4,991,691 | 2/1991 | Brawer et al. | 52/182 X |
| 5,213,060 | 5/1993 | Sloan et al. | 119/847 |
| 5,454,196 | 10/1995 | Gaines et al. | 52/183 |

FOREIGN PATENT DOCUMENTS

| 2110737 | 6/1983 | United Kingdom | 52/182 |
|---|---|---|---|
| 85/01769 | 4/1985 | WIPO | 52/182 |

*Primary Examiner*—Robert P. Swiatek
*Assistant Examiner*—Elizabeth Shaw

[57] ABSTRACT

A convertible step and ramp combination having a frame (15, 16) with removable steps (19, 23) which may be converted into a ramp (19, 23). The three steps have attached hangers (20) which rest on rods (10, 12) extending between frame while in step mode. Conversion to ramp mode is done by loosening wing nuts (18) and removing three steps, then placing steps at an angle by repositioning three hangers on wooden dowel (14) and rod (11). The step and ramp combination is independent of any other supporting structure and may be used for ascension and descent from a variety of higher surfaces. The steps and convertible ramp are covered with a non-slippage material for traction. The ability to chose between the step or ramp feature allows pets of various physical conditions to safely ascend and descend from higher surfaces.

5 Claims, 5 Drawing Sheets

CONVERTIBLE STEP AND RAMP COMBINATION

FIELD OF THE INVENTION

This invention relates to ramps and steps for pets, allowing pets to climb to various places, such as a chair, car, bed, or a person's lap.

BACKGROUND OF THE INVENTION

Ramps and steps for pets have been introduced into the marketplace as singular units. Each has its advantages for pets, depending on the nature of the need.

The pet ramp, U.S. Pat. No. 5,213,060 issued to Sloan and LeBeau (1993) is intended for support from a bed, using a flap of material inserted between the frame and the mattress. The second anchorage takes the form of high friction cups on the bottom end of the frame, attaching to the floor to prevent slippage.

The ramp is limited to primarily box-spring type bed use. This type of ramp is virtually useless if there is no enclosure for the top flap to be inserted into. Thus, the ramp cannot be used with chairs, grooming tables, or vehicles, for example, unless the item of ascension has a means of securing the top flap of the ramp. The angle of the ramp necessitates a length which is space consuming and a hindrance. However, packing the ramp away after every use is a nuisance, and defeats the initial purpose of allowing the pet to ascend at any time to the higher surface.

The pet stool and ramp, U.S. Pat. Des. No. 322,872 issued to Holbrook (1989) incorporates a ramp only, with a platform at the top. The ramp is the only option available to the pet, and takes a considerable amount of space. The ramp does not have a coveting to prevent slippage for pets, thereby making the device intimidating and perhaps dangerous to the animal. Further, the stool and ramp are not collapsible, making storage and transport an inconvenience.

The ramp attached to a pet house as shown in U.S. Pat. No. 3,618,568 issued to Breeden (1971) is not an independent structure, being designed for attachment by hinges to the pet house. The ramp has no means of attachment to other surfaces, and therefore, would fall if used for climbing unto furniture or ascension to a person's lap. Also, the aesthetic appeal is minimal, appearing more as a livestock plank than a piece of pet furniture which may be continuously left out for the pet without being regarded as somewhat of an eyesore.

Ramps for pets must either be steep and consume little space, or less steep and more space consuming. Therefore, the ramps which are currently on the market offer one or the other benefit. Since some pets are intimidated by an incline, and some pets are more comfortable with stairs, having climbed them within the house, the step to ramp feature allows the pet to choose which is less threatening for ascension. If the pet has previously used either the step or the ramp, switching, due to a disability, for example, would be easy for the pet, since it is already familiar with the use of the structure.

OBJECTS AND ADVANTAGES

Several objects and advantages of the present invention are:

(a) to provide a step and ramp combination for pets;

(b) to provide steps for the young, agile dog, capable of converting to a non-threatening ramp for the pet as it ages;

(c) to provide a ramp and steps which are stable, yet lightweight;

(d) to provide a ramp and steps which have a safe, non-slip surface;

(e) to provide a stand-alone ramp and steps, independent of any other object for their function;

(f) to provide a means of altering the steps to ramp or ramp to steps;

(g) to provide a ramp and steps which are compact and portable;

(h) to provide a ramp and steps combination whose standard size will allow access to most furniture heights;

(i) to provide a ramp and steps which have a handle for easy transport from room to room;

(j) to provide a ramp and steps combination which may be made for varied heights;

(k) to provide a ramp and steps combination which may be made of varied materials for outdoor and indoor use.

Further objects and advantages are to provide a step and ramp combination which can be used easily by the pet and owner, in a multitude of settings, allowing the pet access to high places without the assistance of the owner. Further, most pets find stairs familiar, whereas the ramp may be intimidating unless the pet is already familiar with the step and ramp combination. By allowing the pet to become accustomed to the steps, the transition to the pet ramp as the pet ages will not be as intimidating as facing an unfamiliar incline. Some pets may prefer just the steps, whereas others may prefer the ramp. This allows both preferences to be satisfied, and reduction of the training time. This feature is especially useful in a setting where short training time is mandatory; in a pet grooming store, for example. Still further objects and advantages will become apparent from a consideration of the ensuing description and drawings.

SUMMARY OF THE INVENTION

In accordance with the present invention, a stand-alone structure is provided which allows pets access to higher places by using either the step or ramp feature. The step to ramp conversion is done easily by merely loosening 3 wing nuts and inclining the steps.

The step feature is intended for younger, agile dogs, used to climbing stairs, and the ramp feature for the aging or sick dog, now familiar with the steps and therefore, not intimidated by the ramp.

A non-slippage material covers the steps to provide traction for the pet when the invention is in either step or ramp position.

DETAILED DESCRIPTION OF THE PREFERRED EMBODIMENTS

Figure 1:
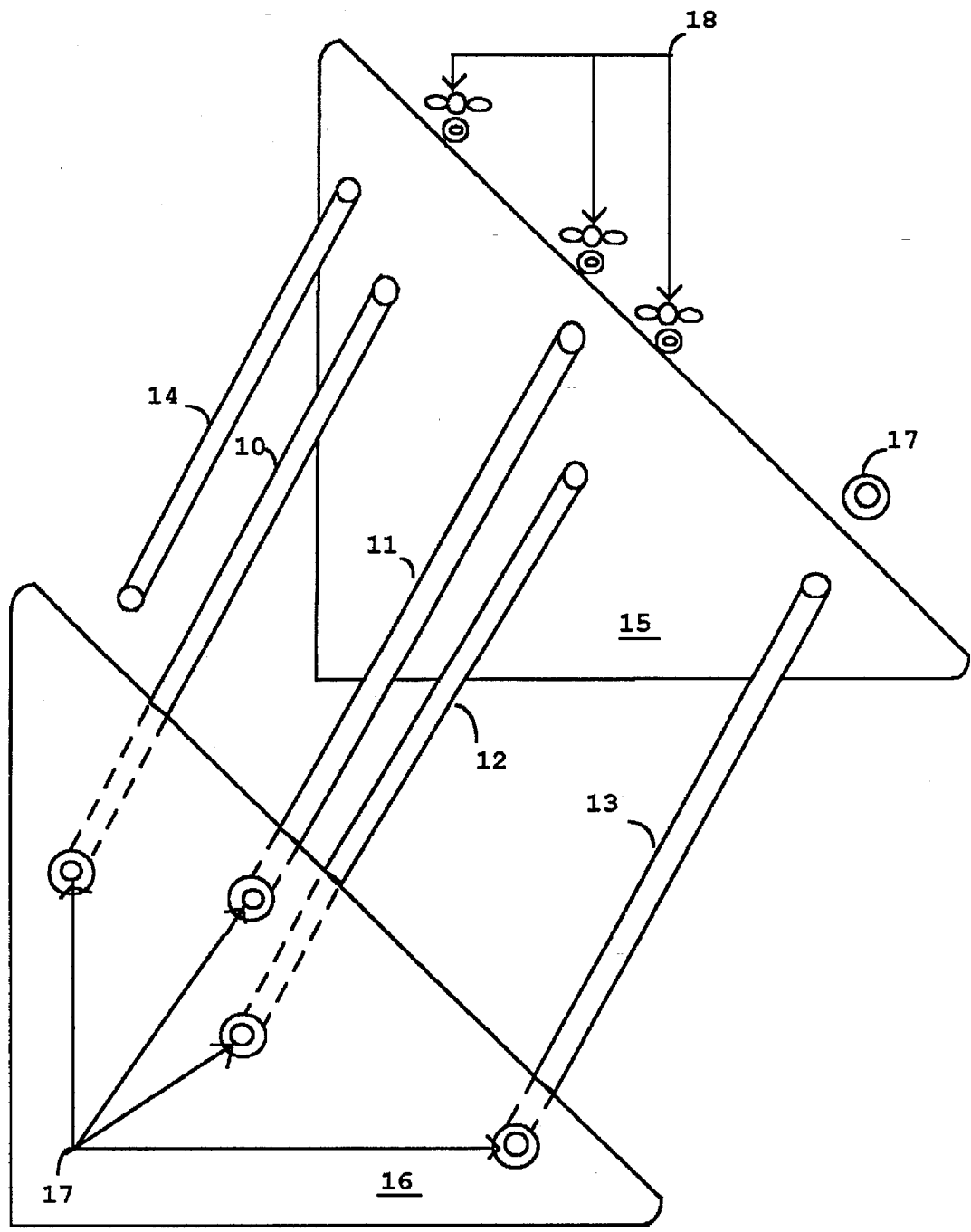
FIG. 1 shows a side view of the foundation of the step and ramp combination with no steps or ramp attached according to the invention.

FIG. 1 illustrates a front view of a plywood foundation of the invention without the steps and ramp. The foundation is composed of two 17 inch equilateral triangular pieces of ¼" plywood frames (15, 16) although other material and sizes may be used. Steel threaded reds, ¼" diameter, 10¾" lengths, (10, 11, 12) extend between the 2 plywood frames (15, 16) and are used as supports for the steps and ramps. Steel threaded red (13) 10¼" in length, maintains the 9½" distance between the plywood frames (15, 16). Steel threaded reds (10, 11, 12, 13) are secured to the plywood frame (16) by three prong tie nuts (17) inserted into ¼" diameter drilled holes of the plywood frame (16). The other end of the steel threaded red (13) is also inserted into a three prong tie nut (17) on the parallel plywood frame (15). Each of the other three steel threaded reds (10, 11, 12) are inserted into the ¼" drilled holes of plywood frame (15) and secured by washers and wing nuts (18).

Both insides of plywood frames (15, 16) have a ¼" diameter hole drilled to a depth of ⅛, henceforth referred to as a pocket hole, since the hole is not drilled entirely through. Each end of the ¼" diameter, 10" length wooden dowel (14) is inserted into the pocket holes. The wooden dowel is used, to maintain the width and stability of the frame structure, as a support for the top step when the ramp configuration is used and as a handle to carry the entire unit. The dowel may be easily removed if it is not wanted as a handle, and the pet uses the step function only.

The distances between the steel threaded rods (10, 11, 12, 13) as positioned in foundation plywood frames (15, 16) will determine the height of the steps. The length of the steel threaded rods (10, 11, 12, 13) and wooden dowel (14) will determine the width of the steps. The dimensions following are intended for a convertible step and ramp combination accommodating a small pet, although larger steps are possible by revising all relevant dimensions.

The pocket holes for the wooden dowel are drilled 3" from the top and 1" from the back of plywood frames (15, 16). A first steel threaded rod (10) is inserted into drilled holes 8" from the top and ½" from back of plywood frames (15, 16). A second steel threaded rod (11) is fit into a holes drilled 8" from the bottom and 6½" from the back of plywood frames (15, 16). A third steel threaded rod (12) is inserted into drilled holes 4¼" from the bottom and 5" from the back of plywood frames (15, 16). A fourth steel threaded rod (13) is fit into holes drilled 3½" from the bottom and 11½" from the back of plywood frames (15, 16).

Figure 2:
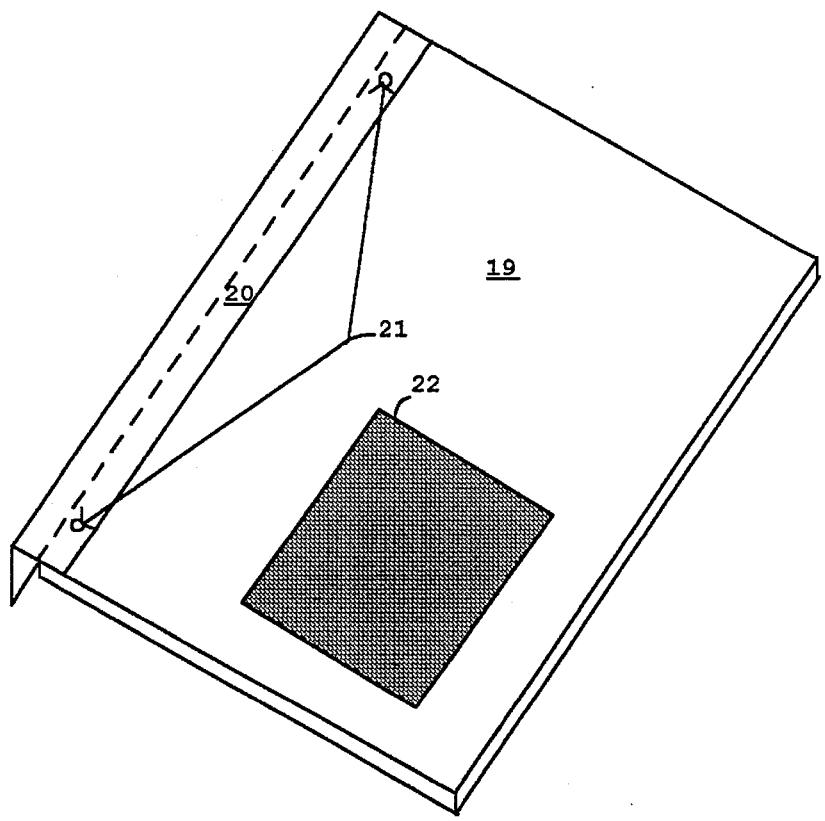
FIG. 2 shows a top view of the invention with angle aluminum on the step and a carpeted plywood step.

FIG. 2 shows a top step (19) of the convertible step. The step (19) is constructed of ¼" plywood, 7" by 9½", although other proportional dimensions may be used to accommodate pets of larger or smaller sizes. An aluminum hanger (20) is constructed of a piece of angle aluminum, 1×1"×¹⁄₁₆", 9½" in length, with two ⅛" holes drilled 1" from each side into the aluminum hanger (20) and through the top step. The aluminum hanger (20) is attached to the top step (19) by ⅛"×½" screws (21) inserted into the drilled holes and secured by nuts. The aluminum hanger protrudes ¼" beyond the top step to fit over the first steel threaded rod (10) FIG. 1, when in step mode. In ramp mode, the aluminum hanger fits over the wooden dowel (14) FIG. 1. The step (19) is covered with a non-slippage material (22) to provide traction and safety for the pet.

Figure 3:
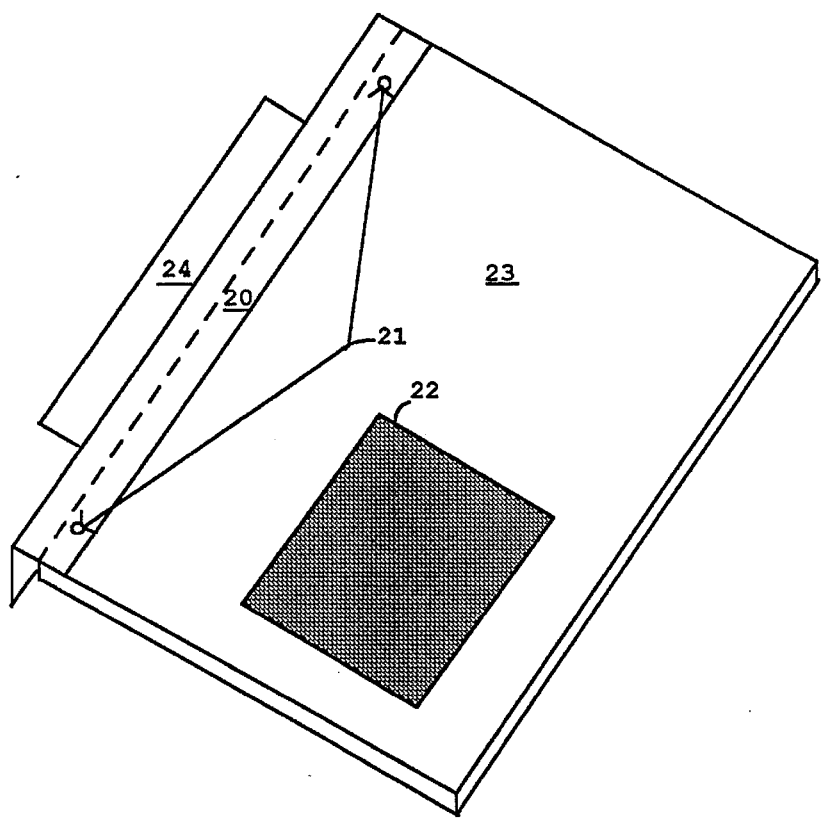
FIG. 3 shows a top view of the carpeted bottom step of the invention and a supporting center portion of the angle aluminum for the ramp position.

FIG. 3 shows a bottom step (23) of the convertible step. The step is a duplicate of the top step (19) FIG. 2, except the portion of the aluminum hanger (20) which hangs over the steel threaded rod (12) FIG. 1, has a 5½" wide center piece of aluminum (24) extending beyond the aluminum hanger (20). The center aluminum (24) is formed by two 1" deep cuts located 2" from each end of the protruding aluminum hanger (20). The cut aluminum piece is then bent outward at a ninety degree angle parallel with the bottom step (23). The center aluminum (24) forms the base for the back of the top step (19) FIG. 2, to rest on when the step and ramp combination is in the rump mode. The aluminum hangers (20) on both the top step (19) FIG. 2, and the bottom step (23) hold the steps in step or ramp position and ensures no back and forth shifting of the steps. The bottom step (23) is also covered with a non-slippage material (22).

Figure 4:
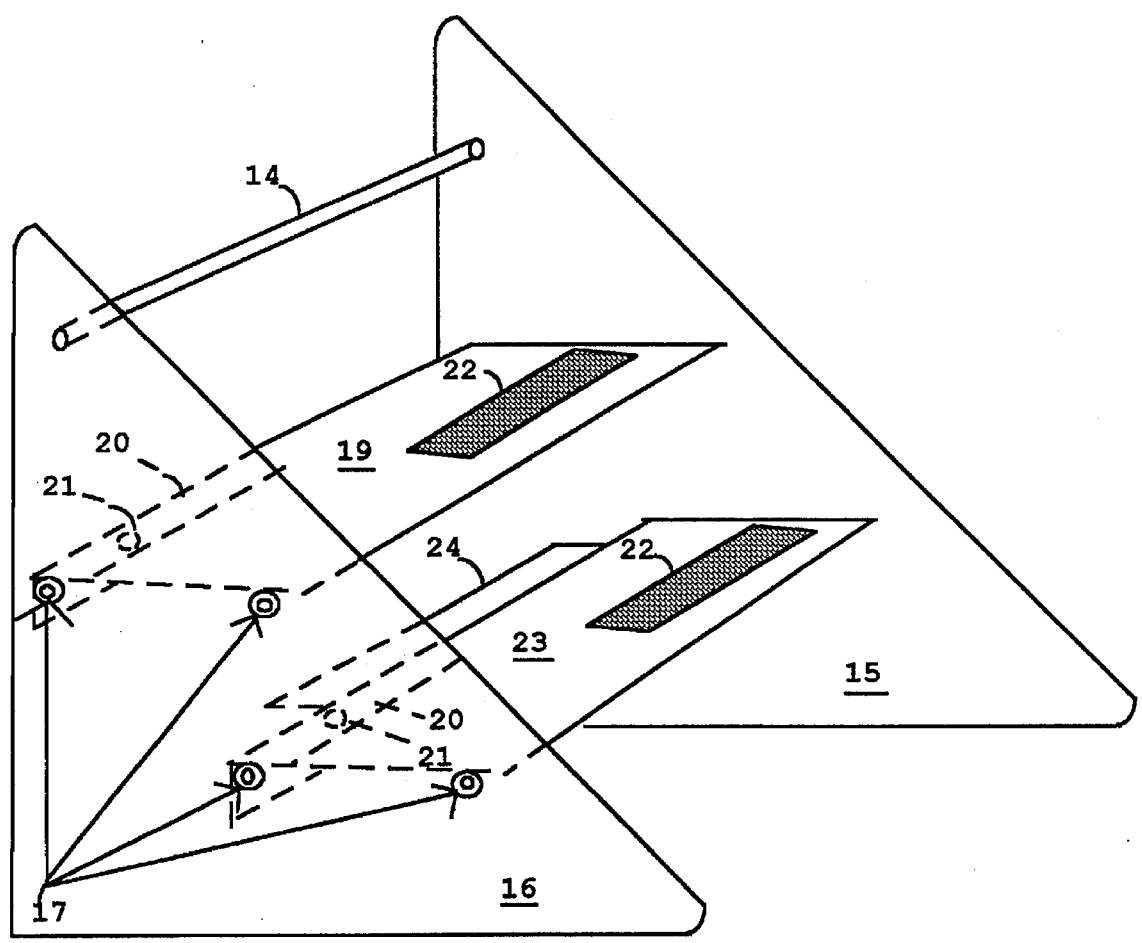
FIG. 4 shows a side view of the invention in the step mode.

FIG. 4 illustrates the current invention when in step mode. The broken lines illustrate how the steps (15, 19) and aluminum hangers (20) rest on the steel threaded rods (10, 11, 12, 13) FIG. 1.

Figure 5:
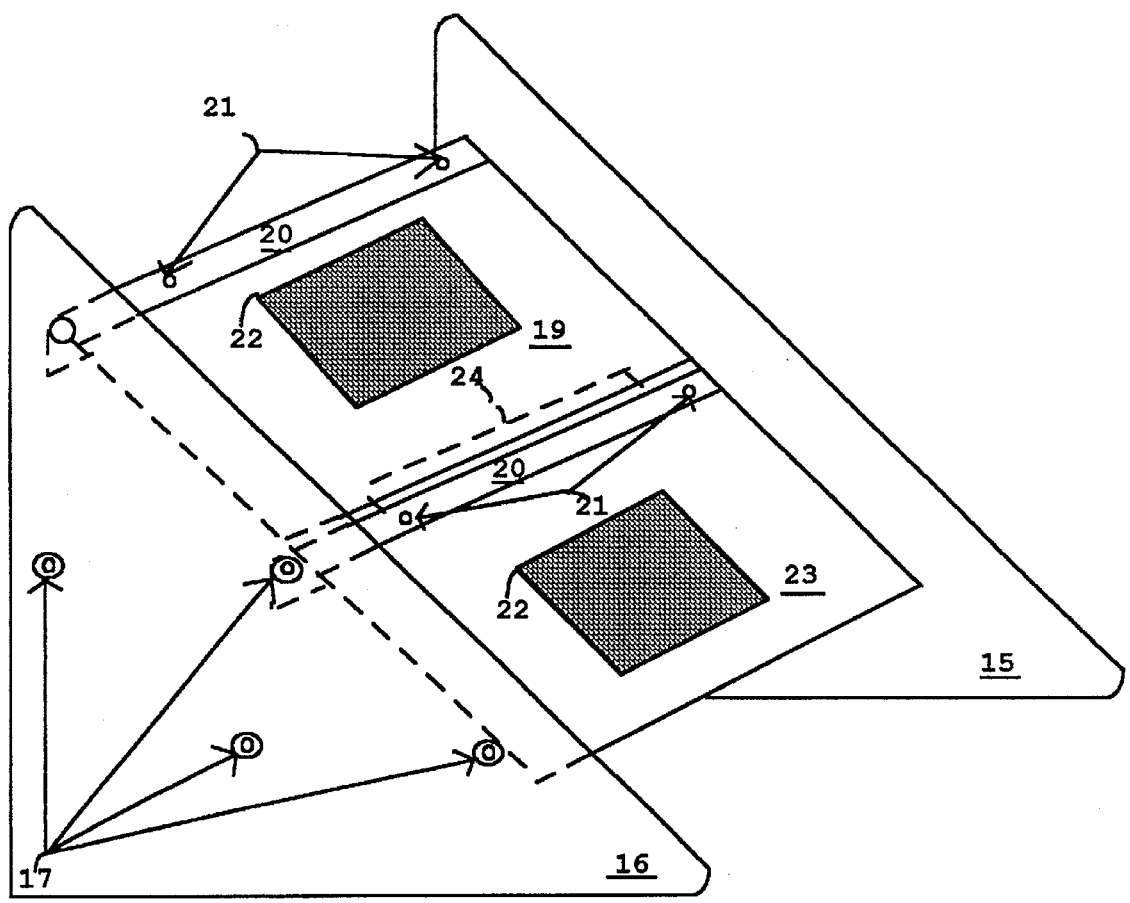
FIG. 5 shows a side view of the invention in the ramp mode.

FIG. 5 illustrates the ramp mode of the convertible step and ramp combination. The broken lines illustrate how the top step (19) rests on the wooden dowel (14), and the bottom step (23) rests on steel threaded rods (11, 13) FIG. 1. The back of the top step (19) rests on aluminum hanger (20) of bottom step (23).

Figure 6:
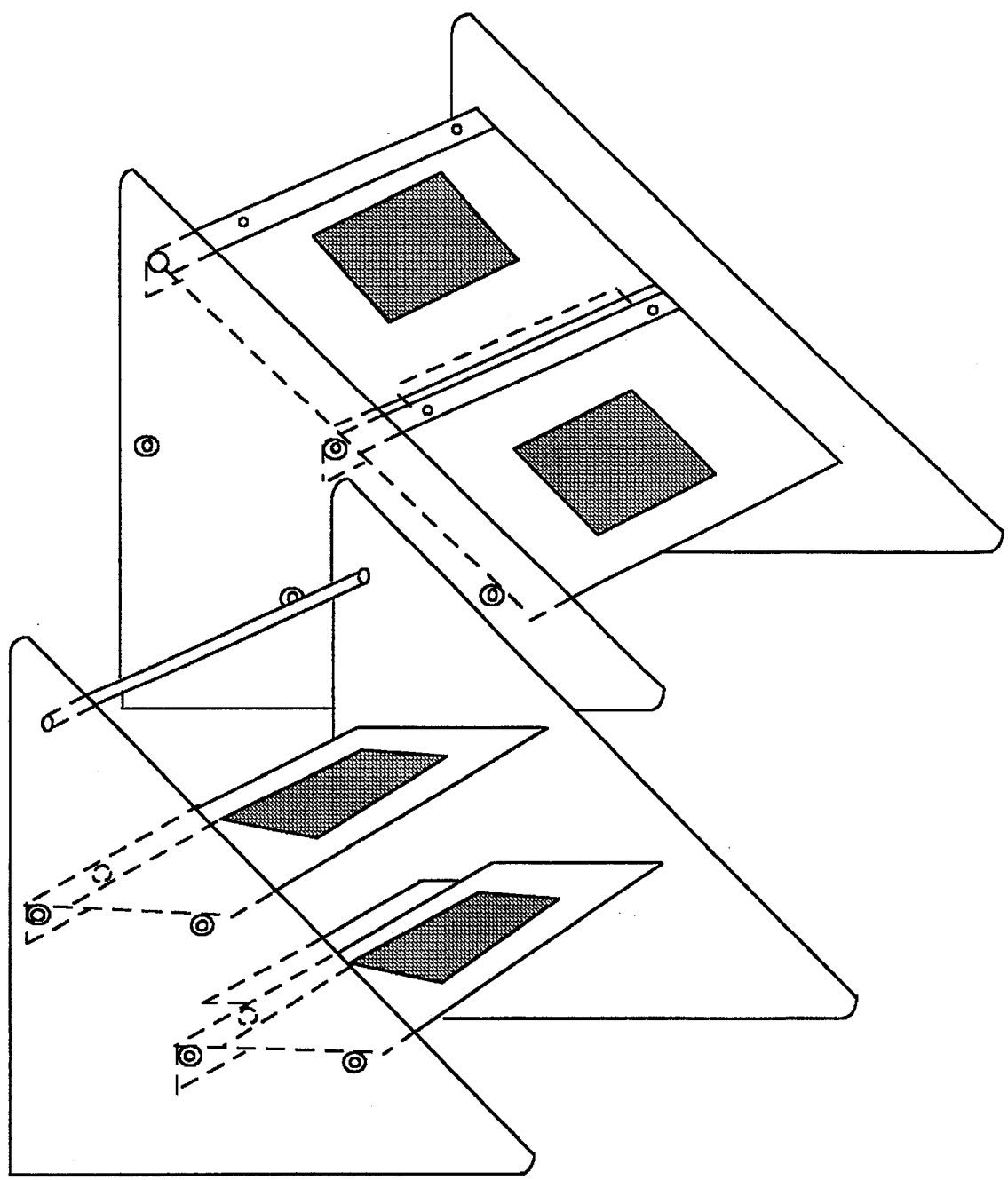
FIG. 6 shows a side view of the invention in the ramp mode and in the step mode.

FIG. 6 shows the step and ramp combination in the ramp mode and in the step mode.

OPERATION OF THE INVENTION FIGS. 1, 4, 5

The invention is converted from step mode to the ramp mode by the following operations.

Wing nuts (18) FIG. 1, are loosened on steel threaded rods (10, 11, 12) FIG. 1. The top step (19) FIG. 4, is lifted up from its resting points on steel threaded rods (10, 11) FIG. 1. The aluminum hanger (20) of the top step (19) is then fit firmly over the wooden dowel (14) FIG. 1, allowing the step to lay at an angle, and form the top of the ramp.

The bottom step (23) FIG. 4 is lifted from its resting points on steel threaded rods (12, 13) FIG. 1. The back of the top step (19) is lined to allow the bottom step's (23) FIG. 4 aluminum hanger (20) to fit over steel threaded rod (11) FIG. 1. The back portion of the step will remain on steel threaded rod (13). The back of top step (19) FIG. 4 is then placed on top of the extending cut out portion of center aluminum (24) of the bottom step (23). This arrangement serves as a support for the back of the top step (19) thereby forming the ramp position FIG. 5. The wing nuts (18) FIG. 1, are tightened. To convert from the ramp to step configuration, as in FIG. 4, simply reverse the above process. The entire conversion process takes less than one minute.

CONCLUSION, RAMIFICATIONS, AND SCOPE OF INVENTION

Thus, the reader will see that the claimed convertible step and ramp combination provides a safe alternative to pets of varying ages and physical conditions for ascension to a higher surface. The unit is lightweight and independent of any other structure for support. Therefore, it is easily moved and capable of being utilized in various rooms and with various pieces of furniture such as a bed, chair, or exam table. It may be used outdoors for ascension into a truck bed, or used in conjunction with a pet door that is too high for the pet to descend from. It is especially useful for climbing unto the owner's lap; thereby reducing the risk of injury from bending over to pick up the pet. In addition, it is easily disassembled for storage and transport. Furthermore, the step and ramp have the additional advantages in that:

- the unit may be left out for constant use, as the space requirement is minimal, unlike ramps which extend out at a large angle;
- it allows the pet to begin with the step and move to the ramp as physical limitations prohibit the pet from utilizing steps;

the angle of extension for the ramp is minimal, thereby providing a non-threatening angle of ascension;

the conversion from steps to ramp is easily done and takes a short amount of time;

the steps and ramp are covered with a non-slippage material which provides traction, thereby allowing pet to ascend or descend without slipping;

The specificities above should not be construed as limiting to the scope of the invention, but as providing illustrations of some of the presently preferred embodiments of this invention. For example, the wood building material may be plastic; there may be higher and more steps, the material covering the steps may be a high traction indoor/outdoor material, etc.

Instead of the preceding examples, the scope of the invention should be determined by the appended claims and their legal equivalents.

What is claimed is:

1. A convertible step and ramp combination for assisting animals in climbing from a first surface onto a higher surface comprising:
    (a) in combination, an inclined member and means for providing a step-to-ramp conversion;
    (b) said inclined member having two pieces of rigid material of sufficient size to accommodate the weight of an animal;
    (c) a plurality of elongated support members of equal lengths;
    (d) a plurality of platforms extending between said two pieces of rigid material, said platforms being movable between a flat position in which said platforms serve as steps and an inclined position in which said platforms serve as a ramp extending between said two pieces of rigid material;
    (e) means of joining said elongated support members at right angles to sides of said two pieces of rigid material at spaced locations for horizontal support of said platforms;
    (f) an antislip material covering said platforms;
    (g) hangers connected to said platforms extending at a right angle to said platforms, wherein said hangers fit over said elongated support members.

2. A step and ramp combination as described in claim 1, wherein said two pieces of rigid material further comprise two triangular frames.

3. A step and ramp combination as described in claim 1, wherein said elongated support members further comprise steel threaded rods.

4. A step and ramp combination as described in claim 3, wherein said means of joining comprises a plurality of prong tie nuts and wing nuts each of which joins a respective side of each steel threaded rod to a respective side of each of the two pieces of rigid material.

5. A step and ramp combination as described in claim 4, further comprising a dowel inserted into concavities drilled into said two pieces of rigid material and secured by pressure created by said steel threaded rods attachment to said two pieces of rigid material.

* * * * *